US012714636B2

(12) United States Patent
Dong

(10) Patent No.: US 12,714,636 B2
(45) Date of Patent: Aug. 25, 2026

(54) MASSAGING DEVICE

(71) Applicant: Huang Zhong Dong, Shenzhen (CN)

(72) Inventor: Huang Zhong Dong, Shenzhen (CN)

( * ) Notice: Subject to any disclaimer, the term of this patent is extended or adjusted under 35 U.S.C. 154(b) by 0 days.

(21) Appl. No.: 18/950,114

(22) Filed: Nov. 17, 2024

(65) Prior Publication Data

US 2026/0083627 A1 Mar. 26, 2026

(51) Int. Cl.
*A61H 19/00* (2006.01)

(52) U.S. Cl.
CPC ............. *A61H 19/32* (2013.01); *A61H 19/44* (2013.01); *A61H 2201/1215* (2013.01); *A61H 2201/149* (2013.01)

(58) Field of Classification Search
CPC ........ A61H 19/00; A61H 19/30; A61H 19/32; A61H 19/34; A61H 19/40; A61H 19/44; A61H 19/50; A61H 21/00; A61H 23/00; A61H 23/0254
See application file for complete search history.

(56) References Cited

FOREIGN PATENT DOCUMENTS

CN 201154068 * 11/2008 ............. A61H 19/44

* cited by examiner

*Primary Examiner* — Carrie R Dorna
(74) *Attorney, Agent, or Firm* — John R. Ross, III; John R. Ross

(57) ABSTRACT

The present disclosure provides a massaging device which includes an electric control module, a driving motor electrically connected with the electrical control module, a transmission mechanism connected with the driving motor, a connecting structure connected with the transmission mechanism, and a flexible member connected with the connecting member, the driving motor is configured to drive the flexible member to rotate and reciprocate simultaneously by the connecting structure and the transmission mechanism.

19 Claims, 14 Drawing Sheets

MASSAGING DEVICE

CROSS-REFERENCE TO RELATED APPLICATIONS

The application claims priority of Chinese patent application CN202422329732.7 filed Sep. 24, 2024, which is hereby incorporated by reference in its entirety.

FIELD

The present disclosure relates to a massaging device.

BACKGROUND

Massaging device, as a common product in daily life, can massage the skin and muscles of people, to provide a soothing experience. Nowadays, there are many kinds of massaging devices, such as massaging chairs, massaging pillows, massaging belts, massaging foot baths, massaging eye masks, fascia guns, and health care massaging products. However, the existing massaging devices cannot provide a good massaging effect.

SUMMARY

The present disclosure provides a massaging device which can provide a better massaging effect.

The present disclosure provides a massaging device, which includes: an electric control module; a driving motor electrically connected with the electrical control module; a transmission mechanism connected with the driving motor; a connecting structure connected with the transmission mechanism; and a flexible member connected with the connecting member, wherein the driving motor is configured to drive the flexible member to rotate and reciprocate simultaneously by the connecting structure and the transmission mechanism.

In an embodiment, the massaging device further includes a housing defining an inner space, the flexible member and the connecting structure are at least partially received in the inner space, and the flexible member is configured to rotate and reciprocate without interfering with the housing.

In an embodiment, a gap is defined between an outer surface of the flexible member and an inner surface of the housing.

In an embodiment, an inner surface of the flexible member is provided with at least one massaging protrusion.

In an embodiment, the flexible member includes a body and at least one massaging protrusion arranged on the body, at least a portion of the massaging protrusion is arranged in a spiral shape.

In an embodiment, the connecting structure includes: a receiving member configured to receive the flexible member; and a first connecting member configured to connect the transmission mechanism with the receiving member.

In an embodiment, the connecting structure further includes a second connecting member; and the massaging device further includes an outer housing and a top cover, the second connecting member is configured to detachably connect the top cover with the outer housing.

In an embodiment, the massaging device further includes a housing, the flexible member is sleeved outside the connecting structure, and the connecting structure and the flexible member are rotatably and movably connected with the housing.

In an embodiment, an outer surface of the flexible member is provided with at least one massaging protrusion.

In an embodiment, the transmission mechanism includes: a driving shaft connected with an output shaft of the driving motor; a driving rod defining a spiral groove and a receiving hole for receiving the driving shaft, the driving rod is movably connected with the driving shaft; a sleeve sleeved around the driving rod; and a resisting member fixed on the sleeve and partially received in the spiral groove.

In an embodiment, the massaging device further includes an outer housing and a mounting bracket mounted in the outer housing, the sleeve is mounted on the mounting bracket, the driving rod is partially passed through the mounting bracket to connect with the connecting structure.

In an embodiment, cross sections of the receiving hole and the driving shaft have a polygon shape.

In an embodiment, the transmission mechanism includes: a gear set having an input gear connected with an output shaft of the driving motor, an output gear connected with the input gear, and a transmission gear connected with the input gear; a driving shaft connected with the transmission gear; a driving rod defining a spiral groove and a receiving hole for receiving the driving shaft, the driving rod is movably connected with the driving shaft; a sleeve rotatably sleeved around the driving rod and connected with the output gear; and a resisting member fixed on the sleeve and/or output gear and partially received in the spiral groove.

In an embodiment, the massaging device further includes an outer housing and a mounting bracket mounted in the outer housing, the sleeve and the driving motor are mounted on the mounting bracket, the driving rod is partially passed through the mounting bracket to connect with the connecting structure.

In an embodiment, the massaging device further includes: a flexible cover; a nozzle arranged on the flexible cover; and a negative pressure generator configured to generate positive and negative pressures alternatively, the positive and negative pressures are transmitted to the nozzle by the flexible cover.

In an embodiment, the massaging device further includes: a flexible cover; at least one vibrating protrusion arranged on the flexible cover; and a vibrator configured to enable the at least one vibrating protrusion to vibrate.

In an embodiment, the massaging device further includes a housing, the housing includes an outer housing and a mounting bracket for mounting the transmission mechanism, the mounting bracket is sealed with an inner surface of the outer housing.

The present disclosure further provides a massaging device, which includes: a housing defining an inner space; an electric control module received in the inner space; a driving motor electrically connected with the electrical control module and received in the inner space; a transmission mechanism connected with the driving motor and received in the inner space; a connecting structure connected with the transmission mechanism and received in the inner space; and a flexible member connected with the connecting member and received in the inner space, wherein the driving motor is configured to drive the flexible member to rotate and reciprocate simultaneously by the connecting structure and the transmission mechanism.

In an embodiment, a gap is defined between the flexible member and the housing.

The present disclosure further provides a massaging device, which includes: a housing having a connecting protrusion; an electric control module received in the housing; a driving motor electrically connected with the electrical control module and received in the housing; a transmission mechanism connected with the driving motor and received in the housing; a connecting structure connected with the transmission mechanism, the connecting structure is rotatably and movably connected with the connecting portion; and a flexible member sleeved around the connecting member, wherein the driving motor is configured to drive the flexible member to rotate and reciprocate simultaneously by the connecting structure and the transmission mechanism.

Based on the massaging device in the above embodiments, when the driving motor works, the driving motor is configured to drive the flexible member to rotate and reciprocate simultaneously by the connecting structure and the transmission mechanism. Compared with the existing massaging device, the massaging device of the present disclosure can simulate the real kneading and pressing effects and provide a better massaging effect. Further, the flexible member has a good cushioning effect during the massaging process, to ensure the safety of the massaging device.

BRIEF DESCRIPTION OF THE DRAWINGS

Implementations of the present disclosure will now be described, by way of embodiment, with reference to the attached figures. It should be understood, the drawings are shown for illustrative purpose only, for ordinary person skilled in the art, other drawings obtained from these drawings without paying creative labor by an ordinary person skilled in the art should be within scope of the present disclosure.

The realization of the aim, functional characteristics, advantages of the present disclosure are further described specifically with reference to the accompanying drawings and embodiments.

DETAILED DESCRIPTION

Technical solutions in the embodiments of the present disclosure will be clearly and completely described below by referring to the accompanying drawings in the embodiments of the present disclosure. Obviously, the described embodiments are only a part of, but not all of, the embodiments of the present disclosure. All other embodiments obtained by a person of ordinary skill in the art based on the embodiments in the present disclosure and without making creative work shall fall within the scope of the present disclosure.

There are many kinds of massaging equipment, including large massaging equipment, such as massaging chairs, massaging pillows, massaging belts, massaging foot baths, and small massaging equipment, such as massaging eye masks, fascia guns, airplane cups for men, sperm collector, and electric penis products for women.

The massaging equipment can include multiple massaging devices installed inside. For example, the massaging chairs and massaging foot baths are equipped with multiple massaging devices for massaging different portions of the human body. Of course, the massaging equipment can also include one single massaging device, such as the massaging eye masks, fascia guns, and other health care massaging products. The health care massaging product can be airplane cups for men, sperm collector, electric penis products for women, etc., which are all small individual massaging devices.

The existing massaging devices are designed to simulate human massaging as much as possible, to press and knead the body, so as to stimulate the points and obtain a better sexual experience. In the relevant technology, the massaging devices, such as fascia guns, foot baths, massaging chairs, massaging eye masks, massaging belt, etc., just simple tap or linearly reciprocate to press and stimulate the human skin tissue, to press and stimulate the human skin, such massaging forms and massaging effects need to be improved.

Therefore, the present disclosure provides a new massaging device to improve the massaging effect.

Figure 1:
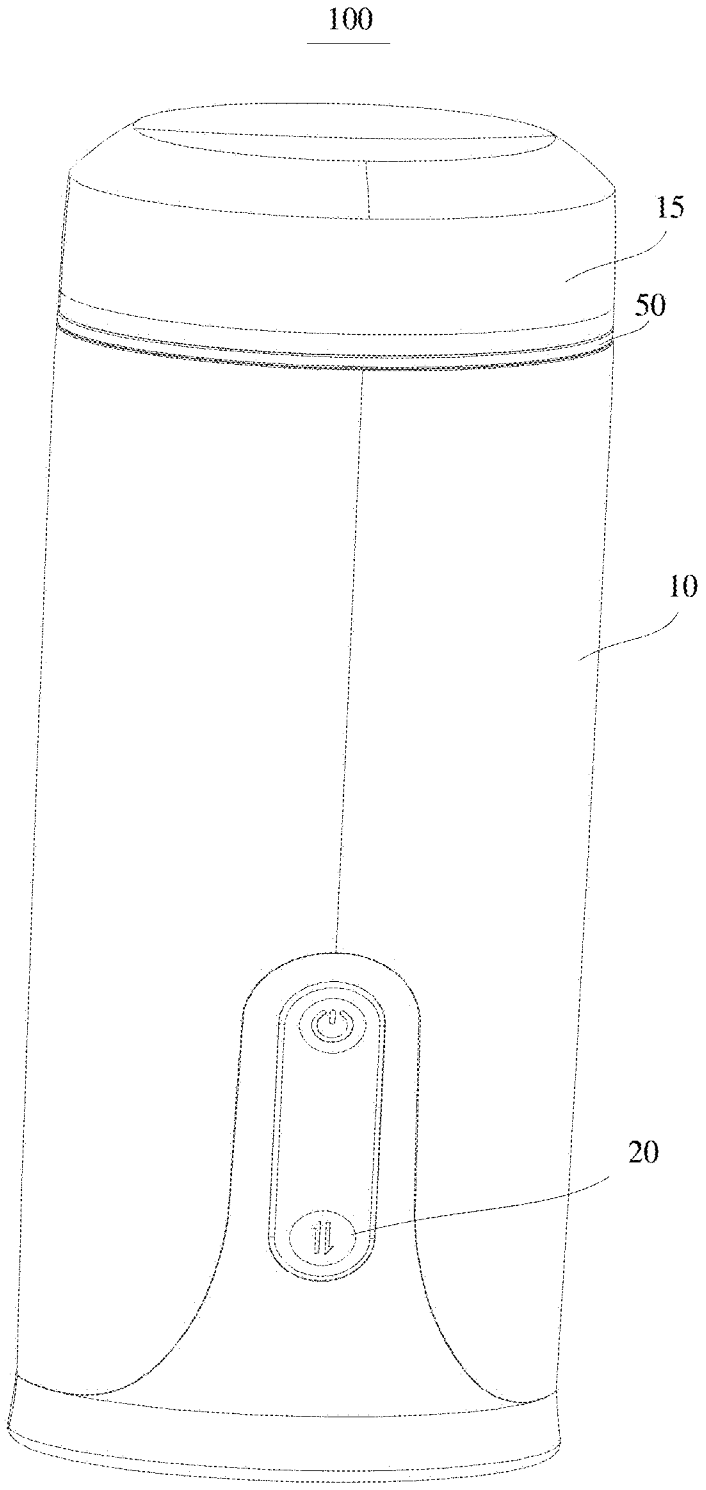
FIG. 1 is a structure diagram diagram of a massaging device of the present disclosure according to a first embodiment.
Figure 2:
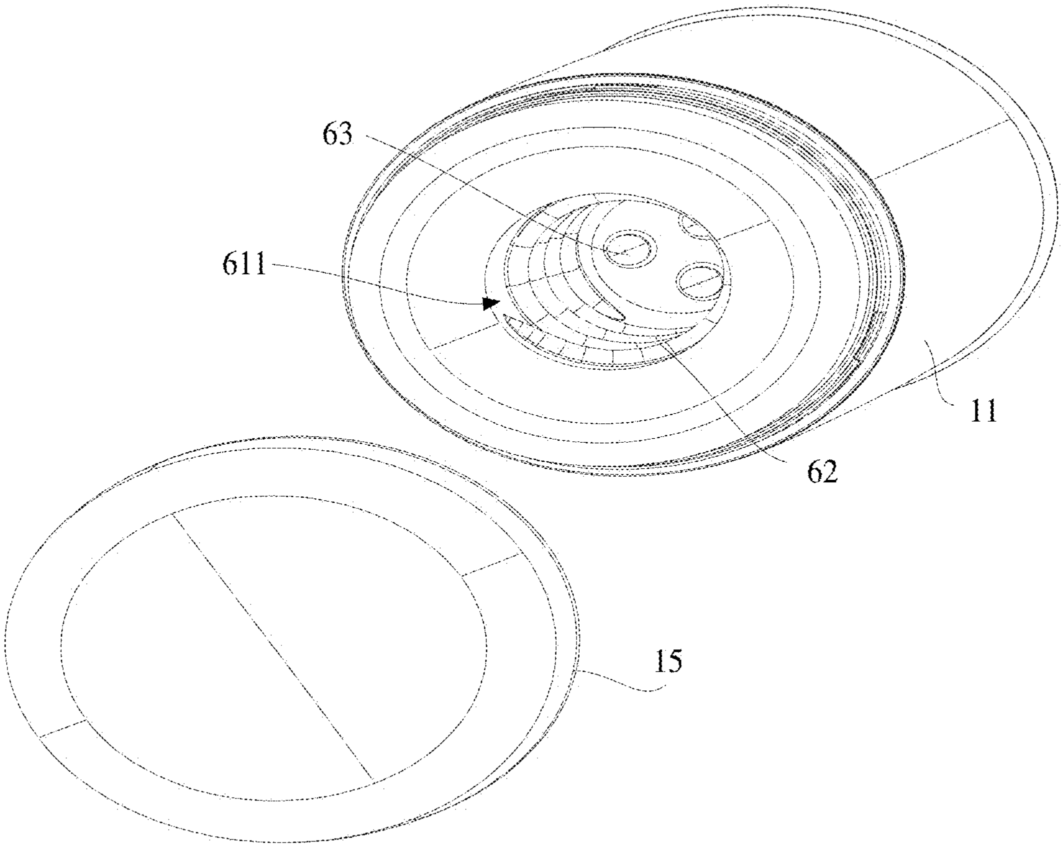
FIG. 2 is an exploded diagram of the massaging device of FIG. 1.
Figure 3:
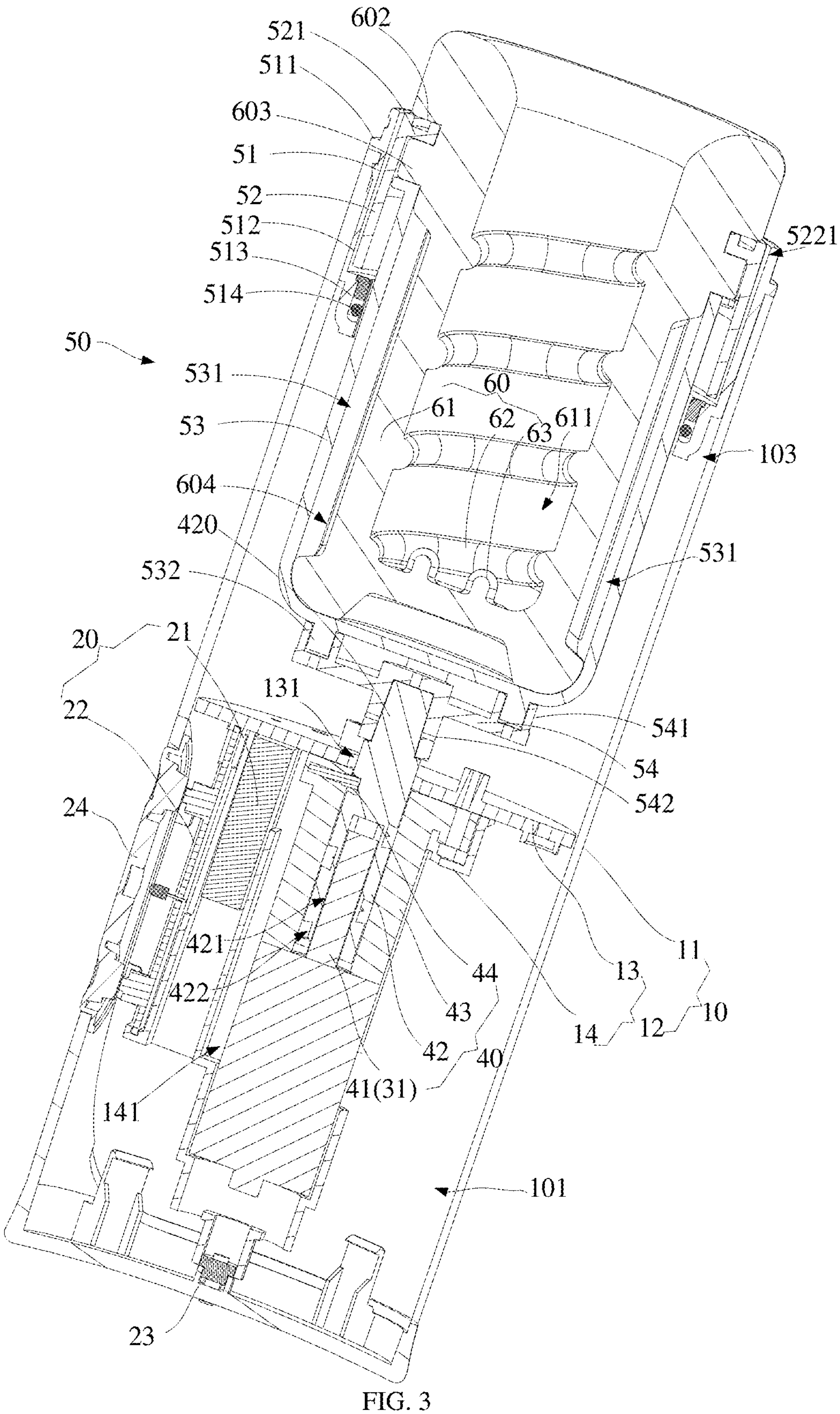
FIG. 3 is a cross sectional diagram of a portion of the massaging device of FIG. 1.
Figure 4:
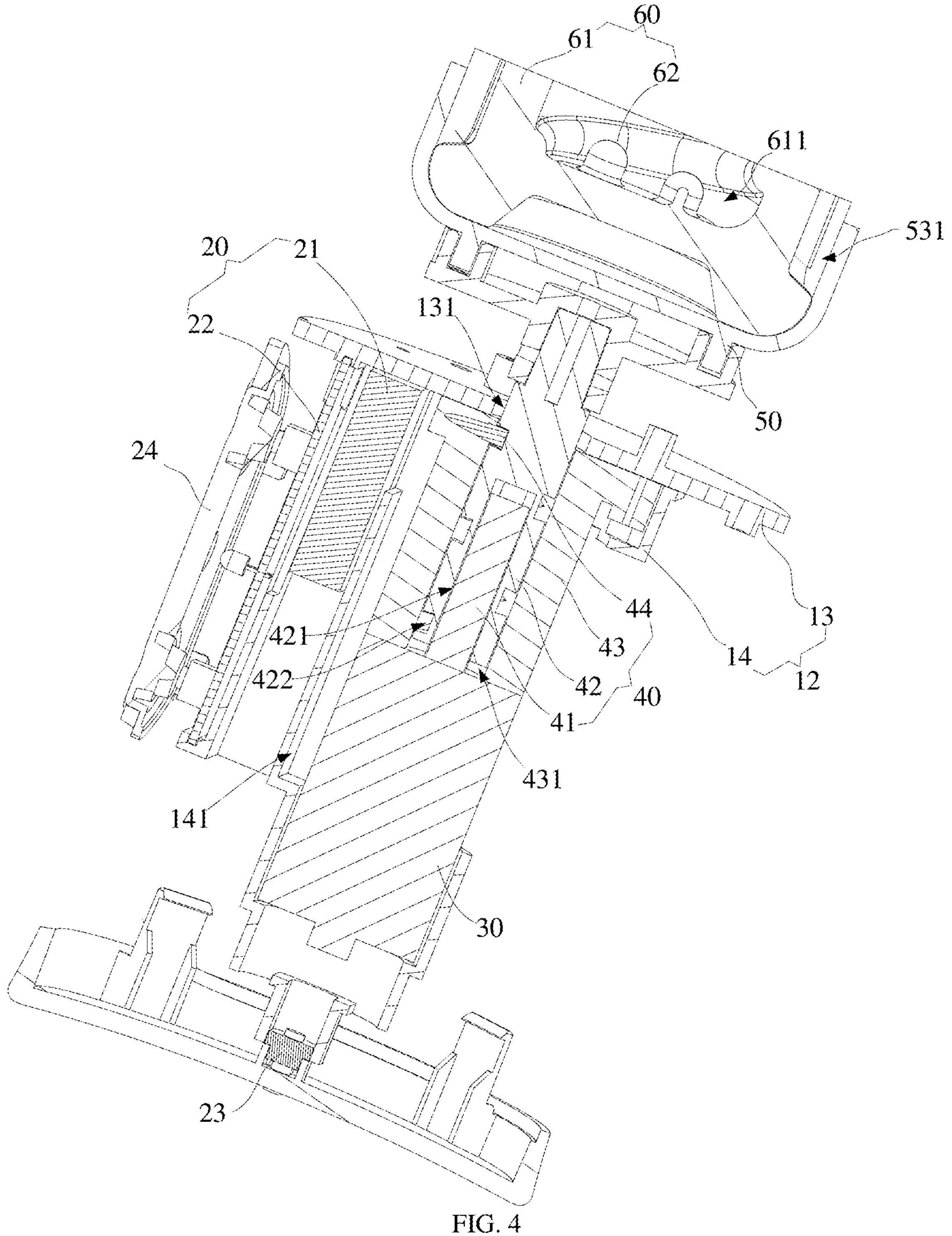
FIG. 4 is a cross sectional diagram of a portion of the massaging device of FIG. 1.
Figure 5:
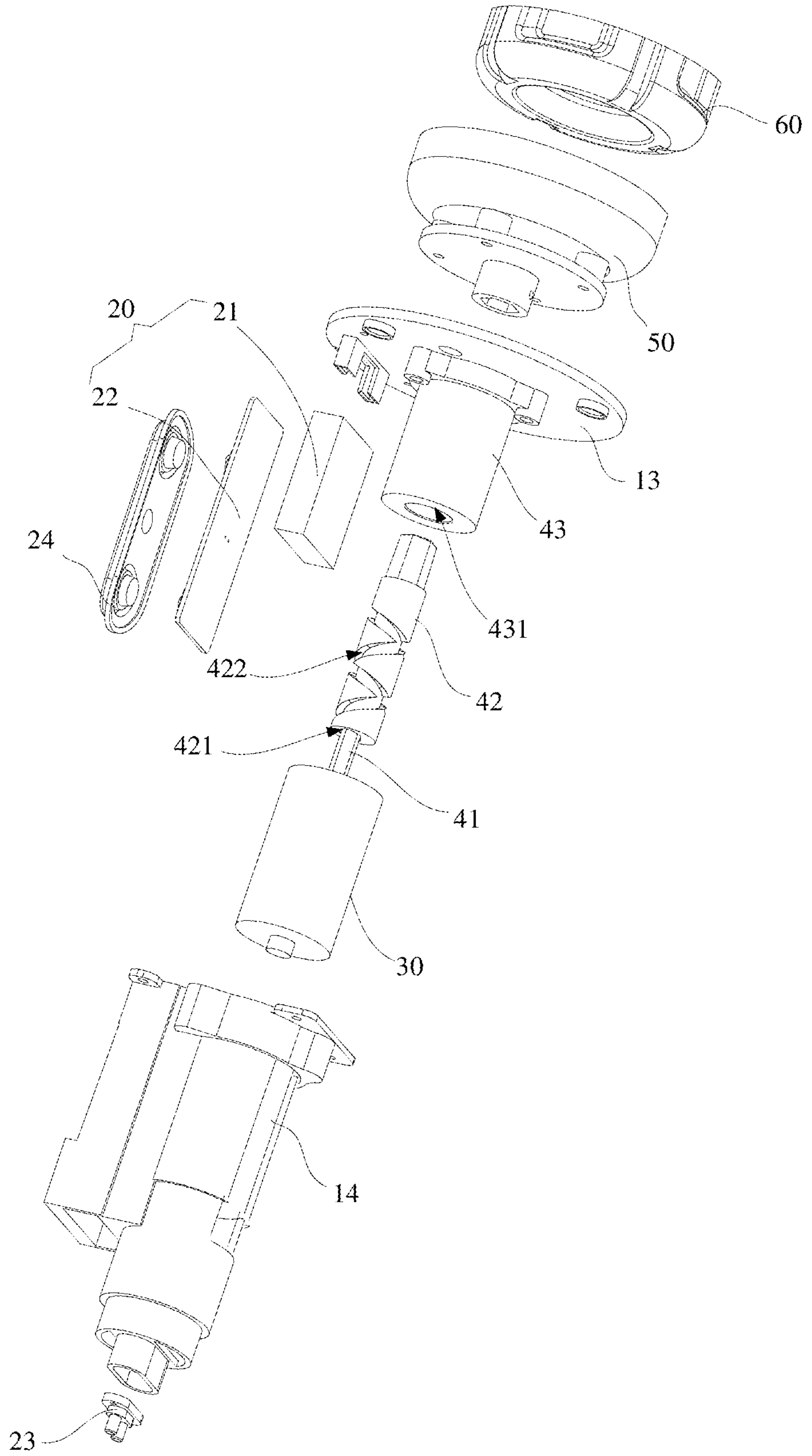
FIG. 5 is an exploded diagram of a portion of the massaging device of FIG. 1.

Referring to FIGS. 1 to 5, in this embodiment, the present disclosure provides a massaging device 1, which includes a housing 10, an electric control module 20, a driving motor 30 electrically connected to the electric control module 20, a transmission mechanism 40 connected with the driving motor 30, a connecting structure 50, and a flexible member 60 used to massage the human body, the electric control module 20 can be a controller, and the connecting structure 50 connects the flexible member 60 with the transmission mechanism 40. The housing 10 has an inner space 101, the electric control module 20, the driving motor 30, the transmission mechanism 40 and the connecting structure 50 are mounted in the inner space 101, the flexible member 60 is separated from the housing 10. The driving motor 30 drives the flexible member 60 to rotate and reciprocate simultaneously by the transmission mechanism 40 and the connecting structure 50, so as to provide a good massaging effect.

In one embodiment, the flexible member 60 rotates and reciprocates simultaneously relative to the housing 10, and the housing 10 remains still. A gap 103 may be defined between an outer surface of the flexible member 60 and an inner surface of the housing 10; or the flexible member 60 contacts with the inner wall of the housing 10, and the flexible member 60 moves and rotates without interfering with the housing 10.

The housing 10 includes an outer housing 11, a mounting bracket 12, and a top cover 15 detachably connected with the outer housing 11. The inner space 101 can be defined by the outer housing 11, or defined by the outer housing 11 and the top cover 13, or defined by the outer housing 11 and the mounting bracket 12. The electric control module 20 is arranged in and protected by the housing 10 when arranged in the inner space 101, so as to improve the safety the massaging device 1.

The outer housing 11 and the top cover 15 are made of plastic material or metal material, such as aluminum alloy, iron alloy, etc., the mounting bracket 12 and the outer housing 11 can be made of the same material or different material, the present disclosure does not limit these. The outer housing 11 can be cylindrical, or a cross-section of the outer housing 11 is ellipses, polygons, etc. The connection between the mounting bracket 12 and the outer housing 11 can be crew connection, bonding, or clamping, etc. When the massaging device 1 is used as a massaging module mounted in a large massage equipment (such as a massaging chair, a foot bath, etc.), the outer housing 11 can be used to mount the components of the massaging device 1 and can also used as a carrier for mounting the massaging device 1 to a rack of the large massage equipment. When the massaging device 1 is used as an independent product, the outer housing 11 is suitable for holding.

The driving motor 30 may be mounted on the outer housing 11, or mounted on the mounting bracket 12, or limited and fixed by the outer housing 11 and the mounting bracket 12 together. The driving motor 30 can be a deceleration driving motor which includes a motor body and a reducer, and the output speed and torque of the output shaft of the drive motor 30 can meet the needs of massage. Of course, when the motor body can meet the required output speed and torque, the driving motor 30 can also be designed without reducer. The motor body can be a rotary driving motor, a normal motor, etc.

When the massaging device 1 is used in a small massaging equipment that can be used alone, the electronic control module 20 includes a battery 21 and a control circuit board 22, and the battery 21 and the driving motor 30 are electrically connected with the control circuit board 22. The battery 21 can be a disposable dry battery or a rechargeable lithium battery. When the battery 21 is a rechargeable battery, the present disclosure has a charging seat 23 arranged on the outer housing 11, the charging seat 23 is electrically connected with the control circuit board 22 and used to charge the battery 21. The charging seat 23 can have two magnetic charging contacts. During the charging process, the charging seat 23 can magnetically attract the external charging plug, as such the charging seat 23 can quickly connect with the external charging plug. In other embodiments, the charging seat 23 is a charging coil which can be coupled to an external charging coil. Further, the massaging device 1 of the present disclosure includes a control button 24 arranged on the outer housing 11, which can be a physical button or touch button. User can start and stop the massaging device 1 by the control button 24, or select the working modes of the massaging device 1 by the control button 24. Of course, the control circuit board 22 can also be provided with wireless interaction modules, such as infrared emission module, Bluetooth, WIFI module, etc., so that user can remotely control the massaging device 1 through APP on the mobile terminal or through the remote control, to improve the convenience of the massaging device 1.

When the massaging device 1 is a massaging module used in a large massaging equipment, the electronic control module 20 is powered by a power module in the large massaging equipment, and the massaging device 1 does not include the battery 21.

Further, the electronic control module 20 is installed and fixed on the mounting bracket 12, so as to improve the assembly efficiency. In particular, the mounting bracket 12 defines a mounting slot (not labeled) to fix the battery 21, and screws are adopted to fix the control circuit board 22 on the mounting bracket 12. The mounting bracket 12 can be sealed with the inner wall of the outer housing 11 to prevent water from flowing into a sub-space (not labeled) defined by the mounting bracket 12 and the outer housing 11.

In the present disclosure, the connecting structure 50 supports the flexible member 60, and connects the transmission mechanism 40 with the flexible member 60. The connecting structure 50 can be made of plastic material. A portion of the connecting structure 50 and the flexible member 60 rotate and reciprocate simultaneously under an action of the transmission mechanism 40 and the driving motor 30. That is, the connecting structure 50 and the flexible member 60 perform two kinds of movements including rotation and reciprocation, namely a spiral forward motion.

The connecting structure 50 includes a connecting member 51 clamped with the outer housing 11, a portion of the connecting member 51 is received in the outer housing 11, and another portion of the connecting member 51 is arranged outside of the outer housing 11. The connecting member 51 includes a step 511 arranged on an edge of the outer housing 11, the top cover 15 is detachably connected with the step 511, so as to detachably connect the outer housing 11 with the top cover 15. The connecting member 51 further defines a through hole 512. A lower end of the connecting member 51 is provided with a receiving portion 513, a diameter of the receiving portion 513 is smaller than that of the through hole 512. At least one ball 514 is received in the receiving portion 513.

The connecting structure 50 further includes a connecting member 52 connected with the flexible member 60. The top end of the flexible member 60 defines a connecting groove 602, the connecting member 52 sleeves around the flexible member 60 and includes a connecting portion 521, the connecting portion 521 is received in the connecting groove 602, for connecting the connecting member 52 with the flexible member 60. A gap 5221 is defined between an outer surface of the connecting member 52 and the inner surface of the outer housing 11; or a gap 5221 is defined between an outer surface of the connecting member 52 and an inner surface of the connecting member 51, to avoid the connecting member 52 from colliding with the connecting member 51 and the outer housing 11 during the rotating and reciprocating process.

The connecting structure 50 further includes a receiving member 53 defining a receiving groove 531, the flexible member 60 is received in the receiving groove 531. The top end of the flexible member 60 further includes a protrusion 603, the protrusion 603 is arranged on the edge of the receiving member 53, and clamped between the connecting portion 521 and the edge of the receiving member 53, to fixedly connect the flexible member 60 between the connecting member 52 and the receiving member 53. A portion of the receiving member 53 extends into the connecting member 52. The flexible member 60 further defines at least one avoiding groove 604 at the outer surface of the flexible member 60 along the axis direction of the flexible member 60, to reduce the weight of the flexible member 60.

The receiving member 53 has at least one connecting protrusion 532 at its bottom wall. The connecting structure 50 further includes a connecting member 54 for connecting the receiving member 53 with the driving rod 42. The connecting member 54 includes a connecting portion 541 and a connecting portion 542, the connecting portion 541 is connected with the connecting protrusion 532, the connecting portion 542 is connected with the driving end 420, so as to connect the driving rod 42 with the connecting member 54. At least one ball 514 is received between the receiving portion 513 and the outer wall of the receiving member 53, to reduce friction between them.

When the driving motor 30 works, the driving rod 42 rotates and reciprocates, and brings the flexible member 60 to rotate and reciprocate simultaneously by the connecting member 54 and the receiving member 53. It should be understood that, during the rotation and reciprocation, the connecting member 54, the receiving member 53, the connecting member 52 rotate and reciprocate simultaneously, and the connecting member 51 and the outer housing 11 do not rotate and reciprocate and remain still.

The flexible member 60 can be made of silicone material. With a soft texture, the flexible member 60 can provide a good cushioning effect when contacting with the human body, to ensure the safety during the massaging process. Understandably, the flexible member 60 can also be made of other materials which can also provide the above cushioning effect. When the massaging device 1 works, there will be no mutual interference between the flexible member 60 and the outer housing 11, that is, the flexible member 60 and the outer housing 11 are separated from each other, which can ensure the smoothness of the spiral forward motion of the flexible member 60. In another embodiment, the flexible member 60 and the outer housing 11 are two independent elements, and the flexible member 60 contacts with the outer housing 11, and the movements of the flexible member 60 does not interfere with the outer housing 11. The outer housing 11 would not deform during the massaging process. For example, the flexible member 60 is slidably received in or sleeved around the outer housing 11, and the flexible member 60 does not contact with the outer housing 11; or the flexible member 60 is slidably received in or sleeved around the outer housing 11, and the flexible member 60 contacts with the outer housing 11.

The flexible member 60 has a body 61 defining a groove 611, a massaging protrusion 62 is protruded on from an inner wall of the groove 611, at least a portion of the massaging protrusion 62 is arranged spirally. At least a second massaging protrusion 63 is arranged on a bottom wall of the groove 611.

It is understandable that the flexible member 60 performs the spiral forward movements, the forward movement can generate a pressing effect on the human body, and the rotation movement can generate a kneading effect on the skin which helps to speed up the blood circulation. Because the massaging area is large, the flexible member 60 can provide an effective massaging effect. Compared with the traditional massaging device with a simple linearly pressing or kneading effect, the massaging device 1 of the present disclosure can simulate the actual kneading and pressing modes simultaneously, to improve the massaging effect. At the same time, the flexible member 60 can provide an effective cushioning effect when contacting user's skin during the kneading and pressing process, to improve the safety.

In one embodiment, the transmission mechanism 40 includes a driving shaft 41, a driving rod 42, a sleeve 43 and a resisting member 44, and the driving shaft 41 is coaxial with the output shaft 31 of the driving motor 30, the resisting member 44 can be a pin or a screw. Of course, the driving shaft 41 can also be formed by lengthening the output shaft 31 of the driving motor 30, and the driving shaft 41 is integrally formed with the output shaft 31; or the driving shaft 41 and the output shaft 31 are two independent elements and connect with each other. The driving rod 42 has a driving end 420 and a receiving hole 421 which are arranged at two opposite ends of the driving rod 42, and the driving rod 42 further has an external spiral groove 422. The driving rod 42 is sleeved outside the driving shaft 41 by the receiving hole 421. The driving rod 42 and the driving shaft 41 are relatively fixed along a circumference direction, and the driving rod 42 can move along an axis direction of the driving shaft 41 and rotate with the driving shaft 41. In particular, the driving shaft 41 and the receiving hole 421 have a polygon cross section, such as a hexagon cross section, and the shape of the receiving hole 421 adapts to that of the driving shaft 41, so that the driving rod 42 can fix to the driving shaft 41 in the circumferential direction, and can slide along the driving shaft 41 in the axis direction of the housing 10.

The sleeve 43 is fixed on the mounting bracket 12, the sleeve 43 has a limiting hole 431, and the driving rod 42 passes through the limiting hole 431. In particular, the mounting bracket 12 includes a support plate 13 and a case 14, the case 14 has a mounting cavity 141, the driving motor 30 and the sleeve 43 are mounted in the mounting cavity 141, and a side of the sleeve 43 away from the driving motor 30 is fixed with the support plate 13 by screws. The support plate 13 is airtightly connected with an end of the barrel shaped outer housing 11, to avoid water from flowing into the case 14. The support plate 13 has an avoiding hole 131 communicated to the limiting hole 431, so that the driving rod 42 can pass through the mounting bracket 12 to connect with the connecting portion 542.

The resisting member 44 is fixed in the sleeve 43 and partially inserted into spiral groove 422, the resisting member 44 is loosely inserted in the spiral groove 422. When the driving shaft 41 and the driving rode 42 rotate, the resisting member 44 resists a groove wall of spiral groove 422 and perform a force on the driving rod 42. Thus, the driving rod 42 slides along the axial direction of the driving shaft 41 reciprocally, and brings the flexible member 60 to rotate and reciprocate simultaneously.

Figure 11:
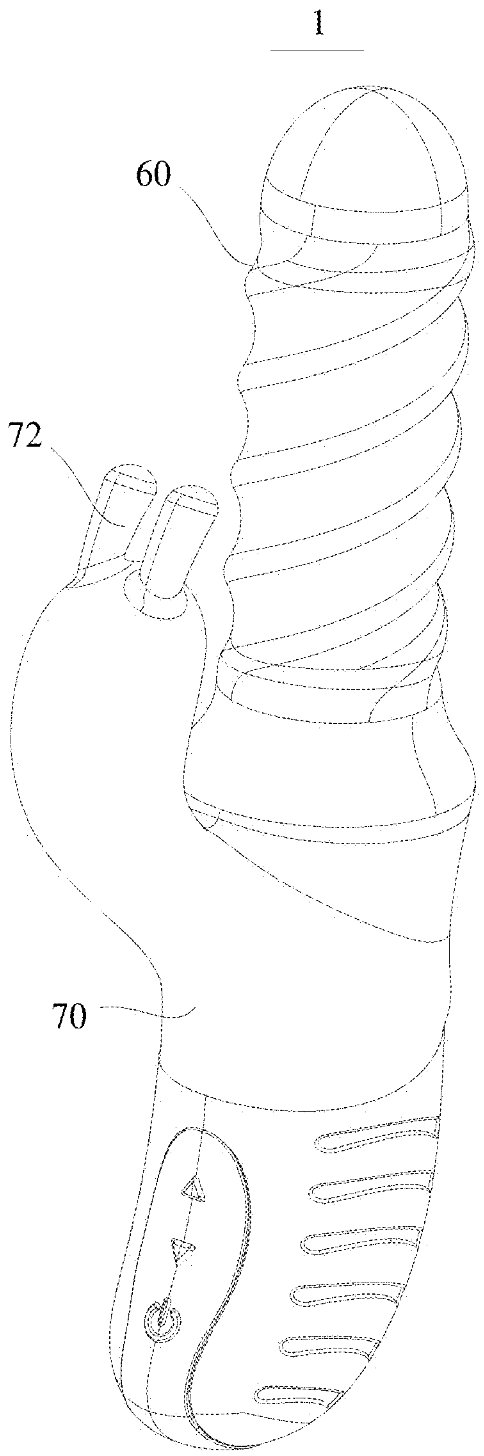
FIG. 11 is a structure diagram diagram of a massaging device of the present disclosure according to a third embodiment.
Figure 12:
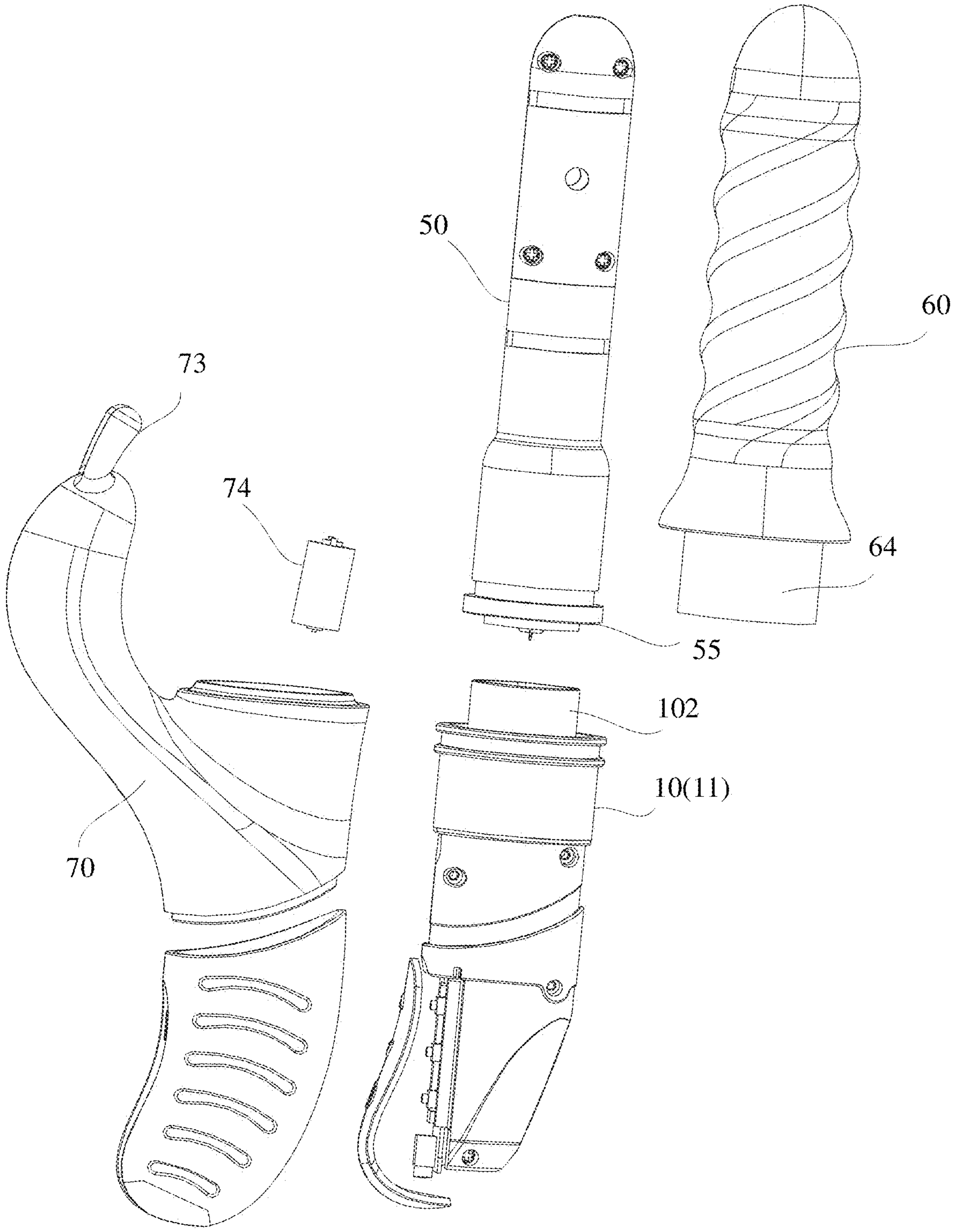
FIG. 12 is an exploded diagram of the massaging device of FIG. 11.
Figure 13:
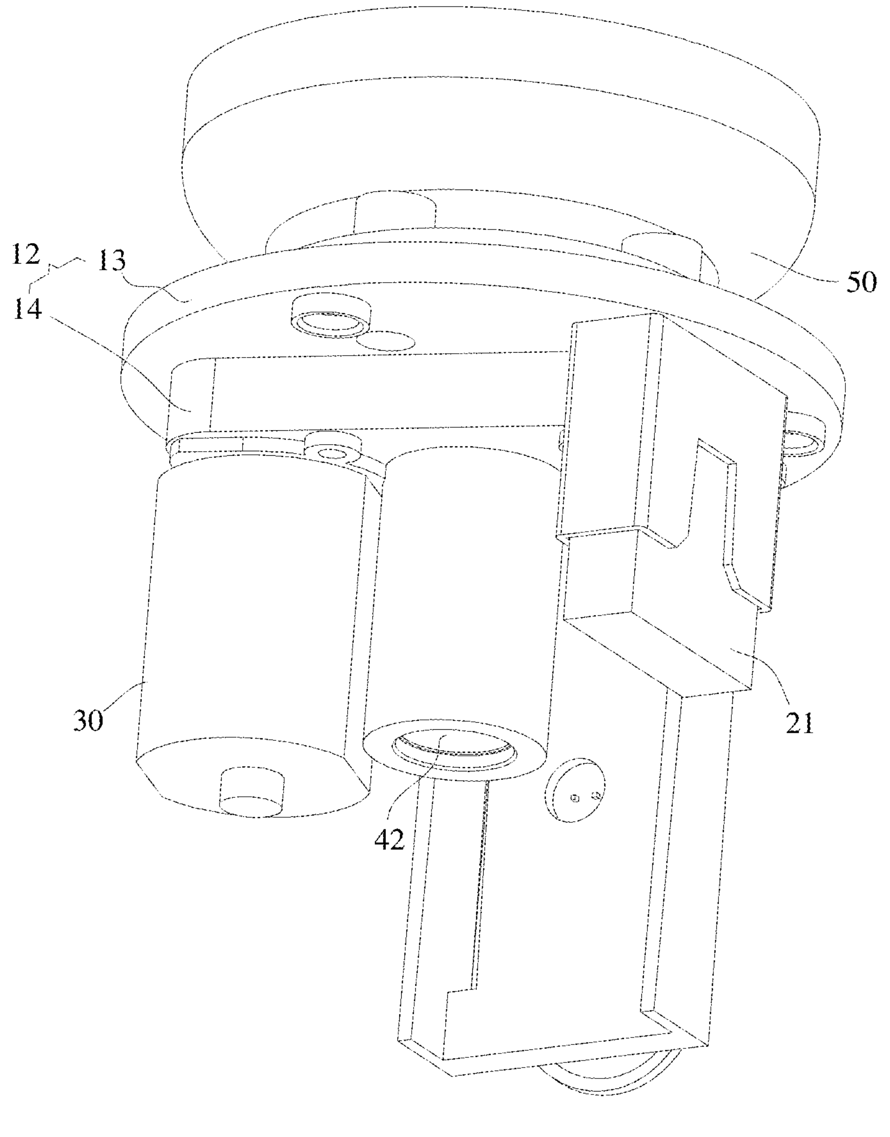
FIG. 13 is a structure diagram diagram of a portion of the massaging device of FIG. 11.
Figure 14:
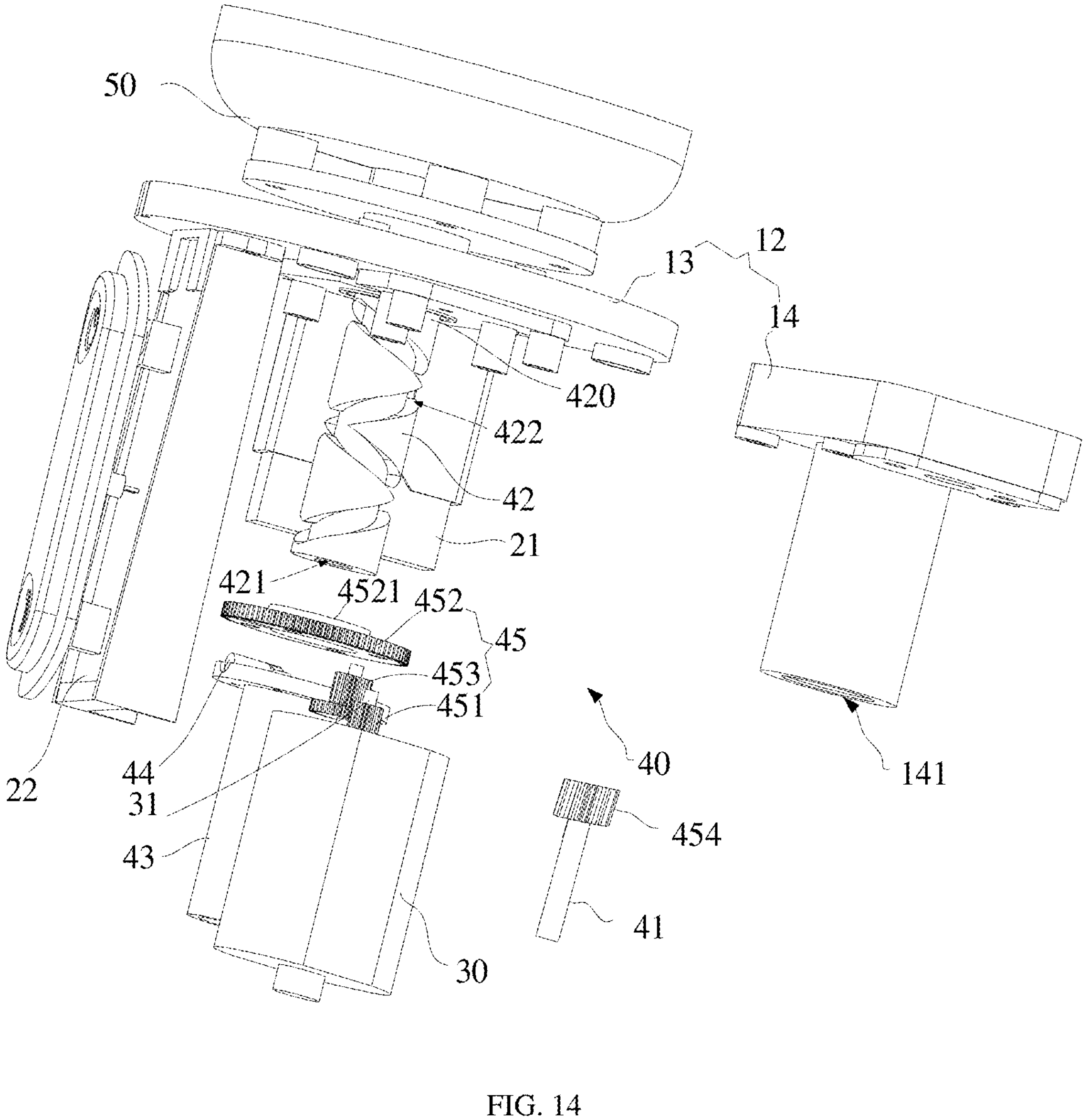
FIG. 14 is an exploded diagram of a portion of the massaging device of FIG. 11.

It is understandable that the transmission mechanism 40 can also have other structures. For example, the sleeve 43 is fixed with the output shaft 31 of the driving motor 30, and the driving rod 42 does not directly connect with the output shaft 31 of the driving motor 30; or the sleeve 43 is connected with the driving motor 30 in a transmission mode, as shown in FIGS. 11-14. The transmission mechanism 40 includes a driving rod 42, a sleeve 43, a resisting member 44 and a gear set 45, the resisting member 44 can be a pin or a screw, the driving rod 42 has a driving end 420, a receiving hole 421, and an external spiral groove 422; the gear set 45 includes an input gear 451 and an output gear 452 connected with the input gear 451; the input gear 451 is fixedly connected with the output shaft 31 of the drive motor 30; the sleeve 43 has a limiting hole 431, and the sleeve 43 is rotatably sleeved around the driving rod 42 and rotatably connected with the housing 10, and the sleeve 43 is fixed to the output gear 452 and rotates with the output gear 452; the output gear 452 is fixedly connected with the sleeve 43 by screws, the resisting member 44 is fixed to the sleeve 43 and/or the output gear 452 and partially inserted into the spiral groove 422, to bring the driving rod 42 to reciprocate. In one embodiment, the resisting member 44 is limited by the output gear 452 and the sleeve 43. The output gear 452 defines a through hole 4521, the driving rod 42 is received in the limiting hole 431 and the through hole 4521, a strip shaped driving shaft 41 is connected with a gear 454, the sliding portion 4231 is received in the receiving hole 421 of the driving rod 42, and the driving rod 42 can move along the strip shaped, the receiving hole 421 of the driving rod 42 can be a through hole. The sliding portion 4231 and the receiving hole 421 have a polygon cross section, such as a hexagon cross section, and the shape of the receiving hole 421 adapts to that of the strip shaped, so that the driving rod 42 can fix to the strip shaped in the circumferential direction, and can slide along the strip shaped in the axis direction of the housing 10. The gear 454 is connected with a transmission gear 453 which is connected with the input gear 451, the transmission gear 453 brings the driving rod 42 to rotate by the gear 454 and the transmission gear 453. The driving end 420 of the driving rod 42 is connected with the flexible member 60 by the connecting structure 50. The driving rod 42 can rotate and reciprocate In this embodiment, as shown in FIGS. 11-14, the driving motor 30 outputs power to the driving rod 42 by the gear set 45, the rotating shafts of multiple gears in the gear set 45 can be arranged parallel to the output shaft 31 of the driving motor 30, so that the driving motor 30 and the driving rod 42 can be arranged parallel to each other. In this way, the size of the massaging device 1 along the axis direction of the driving motor 30 can be reduced accordingly. The driving motor 30 and the gear set 45 can be mounted conveniently in a module mode, or the driving motor 30 and the gear set 45 can be stored, packaged and transported as a separate module. When the driving motor 40 works, the gear set 45 brings the driving rod 42 and the sleeve 43 to rotate, the resisting member 44 brings the driving rod 42 to reciprocate. In this way, the flexible member 60 can rotate and reciprocate simultaneously.

In the embodiment, as shown in FIGS. 11-14, the housing 10 also includes the outer housing 11 and the mounting bracket 12 arranged in the outer housing 11. The housing 10 can be covered by a flexible cover 70, the flexible cover 70 is made of soft plastic or silicone to provide a soft feel. The driving motor 30 is fixedly connected to the mounting bracket 12, the sleeve 43 is rotatably connected to the mounting bracket 12, and a part of the driving rod 42 is extended out of the mounting bracket 12 and fixedly connected to the strip shaped connecting structure 50. In particular, the mounting bracket 12 also has the support plate 13 and the case 14, the sleeve 43 is limited between the support plate 13 and case 14, and the sleeve 43 is received in the mounting cavity 141 of the case 14, and rotatably connected with the case 14.

In the embodiment of the present disclosure, as shown in FIGS. 11-14, the flexible member 60 includes a body 61 fixed to the connecting structure 50 and a massaging protrusion 62 protruded from the body 61 for massaging the portion to be massaged. The massaging protrusion 62 can be integrated with the body 61, or the two elements are independent parts and fixed together. The massaging protrusion 62 can enhance the massaging effect. Specifically, at least a part of the massaging protrusion 62 is in a spiral pattern. The massaging protrusion 62 is a long strip and formed into a spiral pattern. Of course, the massaging protrusion 62 has a plurality of sub protrusions which are arranged to form a spiral pattern. The flexible member 60 has a connecting part 64, the connecting structure 50 also has a connecting part 55 corresponded with the connecting part 64, the top end of the housing 10 has a connecting protrusion 102, the connecting part 55 and the connecting part 64 are rotatably and movably connected with the connecting protrusion 102. The massaging device 1 of this embodiment can also have a vibrator 74, the vibrator 74 can make the massaging protrusion 73 to vibrate to massage a portion of human body, so as to improve the massaging effect. The massaging device 1 further includes a battery 21 and a control circuit board 22.

Figure 6:
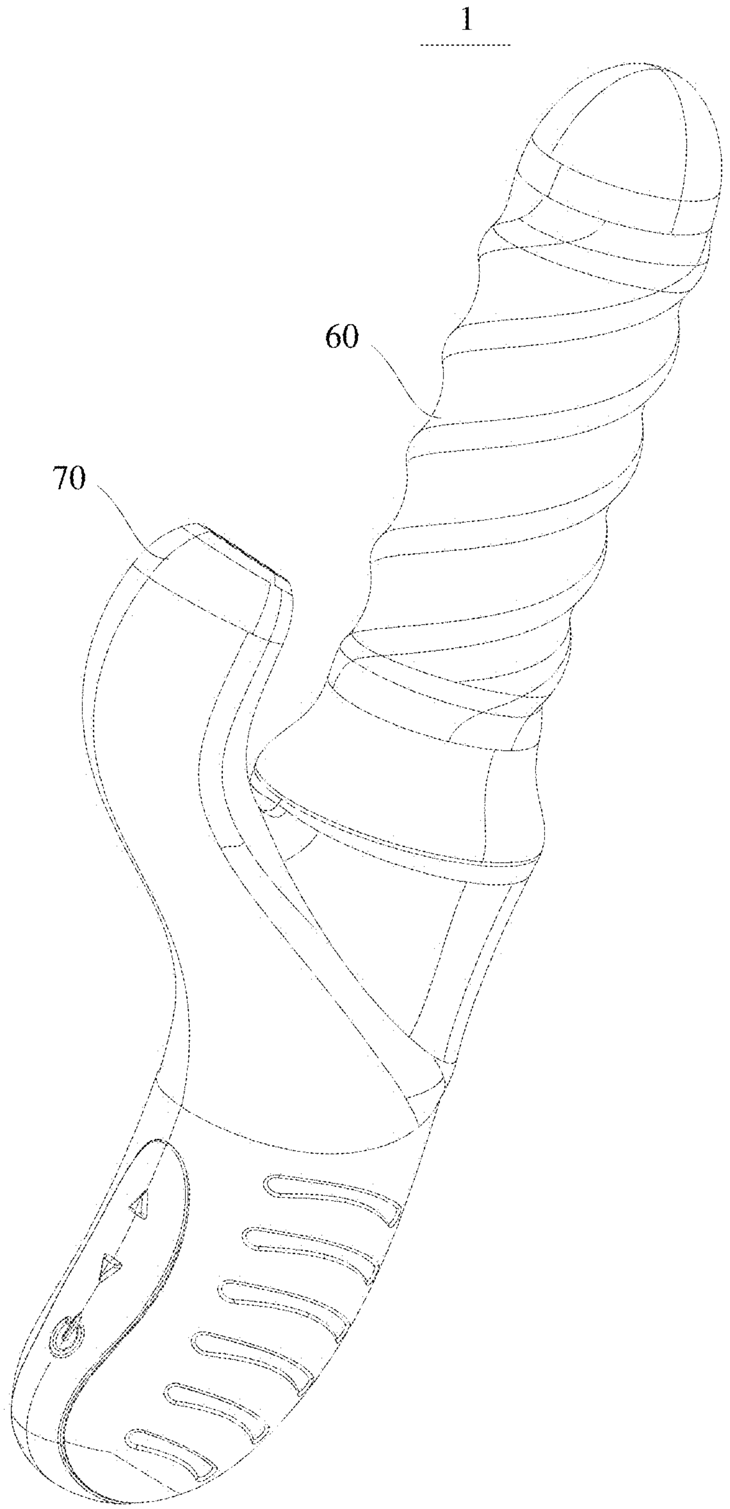
FIG. 6 is a structure diagram diagram of a massaging device of the present disclosure according to a second embodiment.
Figure 7:
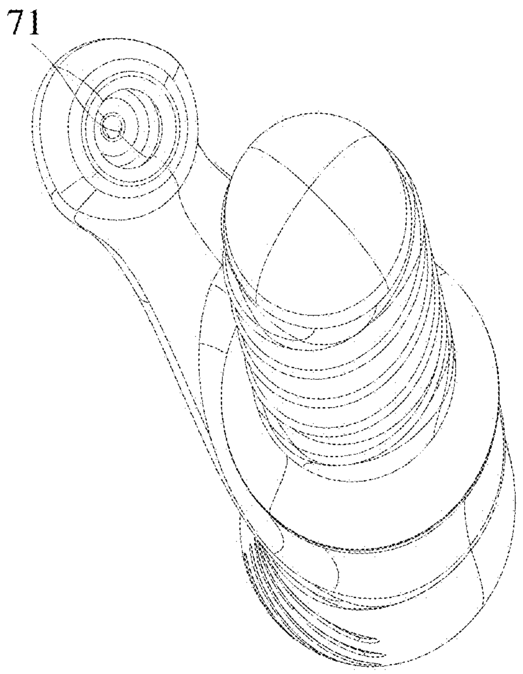
FIG. 7 is another structure diagram diagram of the massaging device of FIG. 6.
Figure 8:
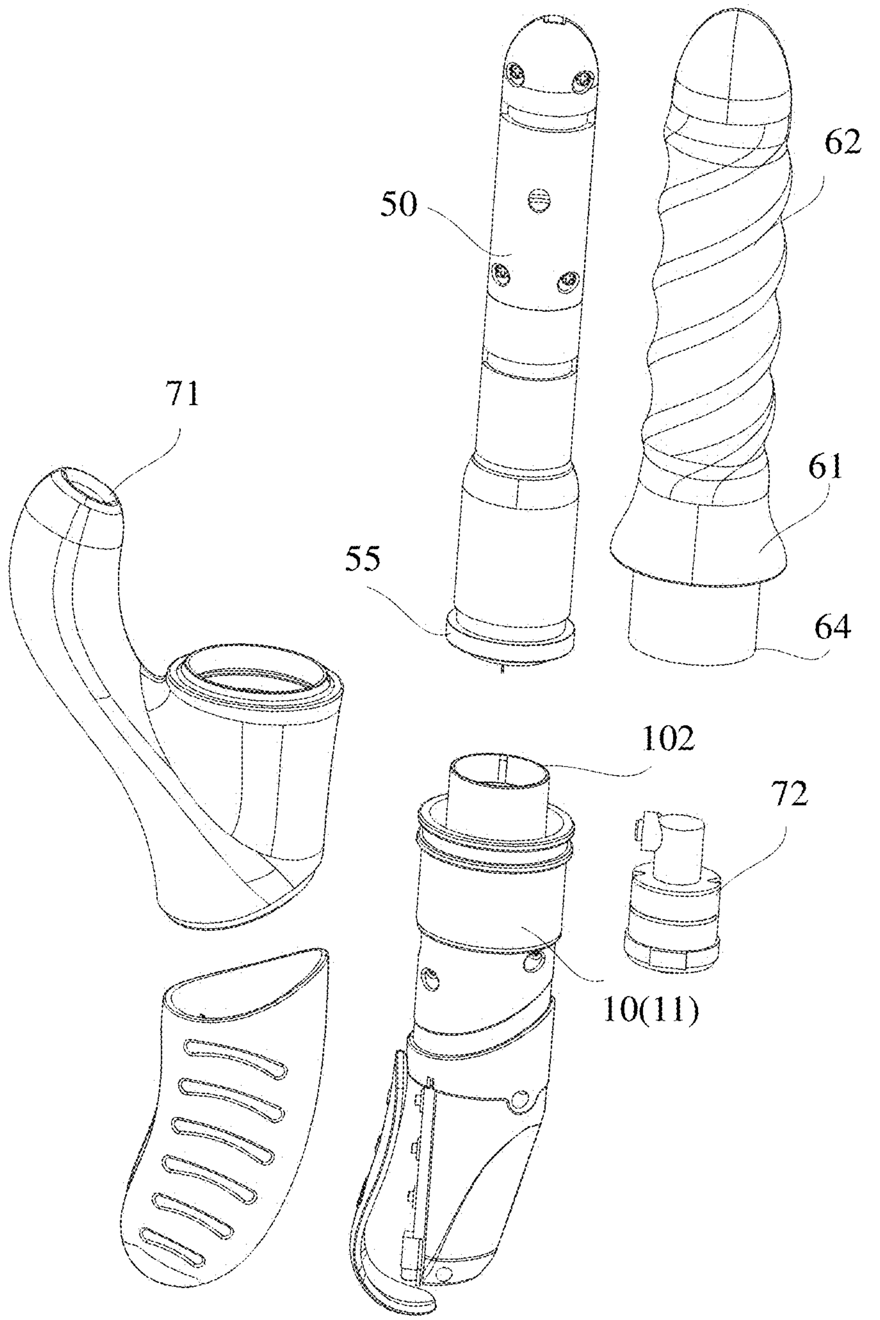
FIG. 8 is an exploded diagram of the massaging device of FIG. 6.
Figure 9:
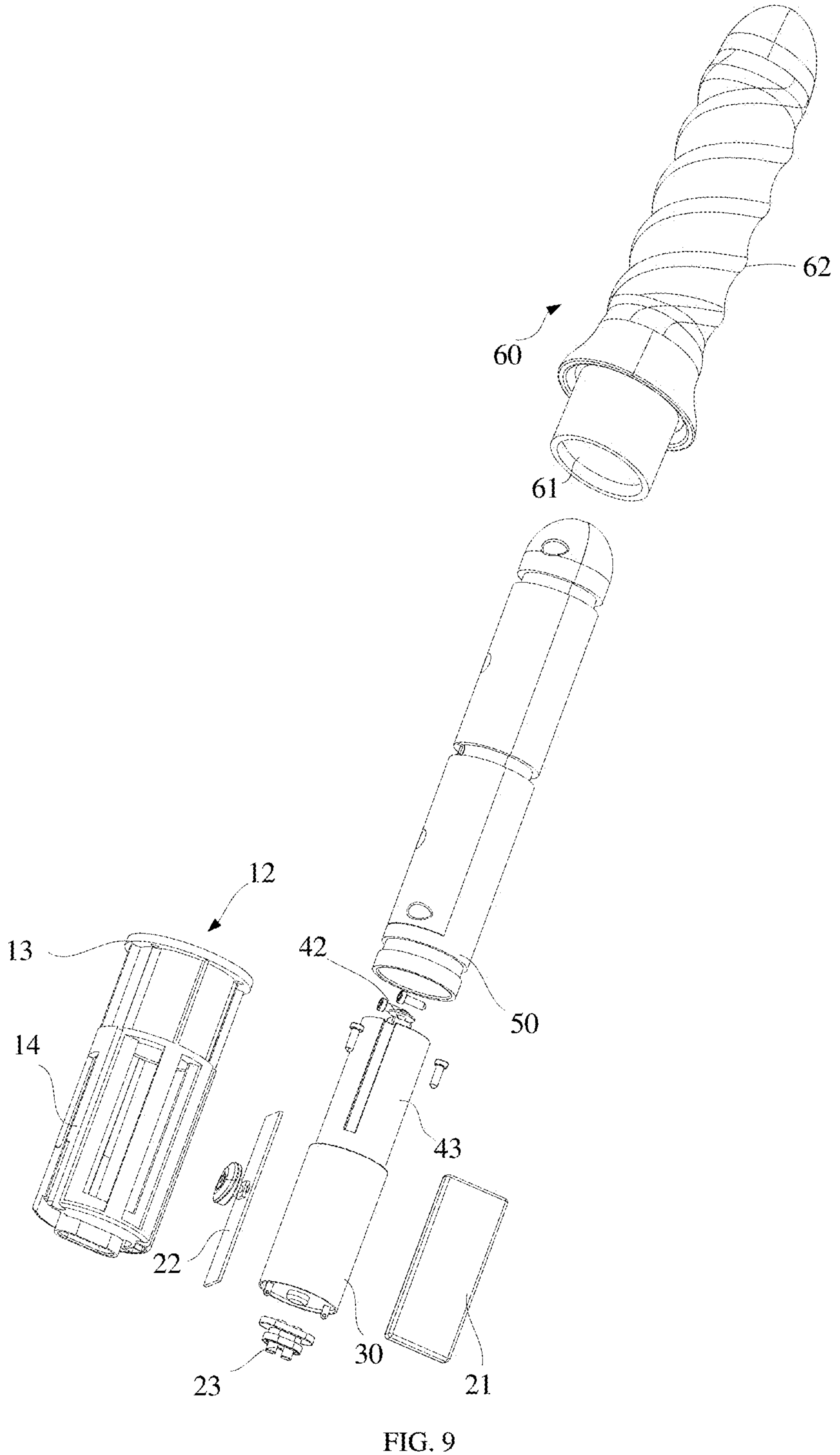
FIG. 9 is an exploded diagram of a portion of the massaging device of FIG. 6.
Figure 10:
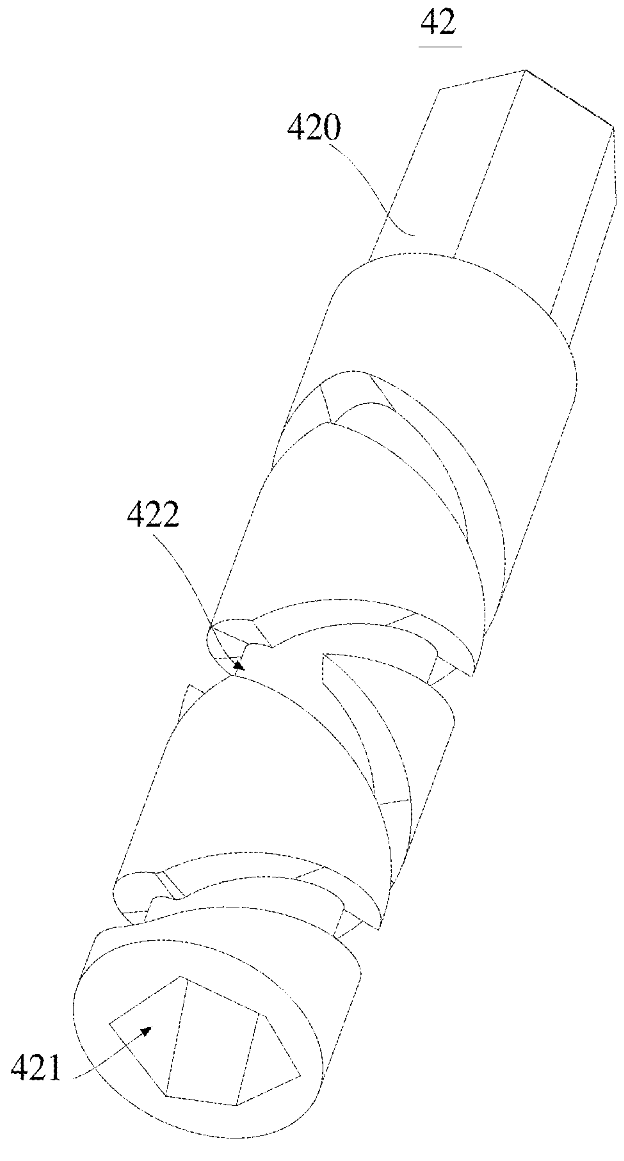
FIG. 10 is a structure diagram diagram of a driving rod of the massaging device of FIG. 9.

As shown in FIGS. 6-10, the connecting structure 50 extends in the direction away from the housing 10 to have a certain length. The housing 10 can be sleeved with a flexible cover 70, the flexible cover 70 is made of soft plastic or silicone to provide a soft feel. The body 61 is sleeved outside the connecting structure 50, and the massaging protrusion 62 is protruded from the outer wall of the body 61. It can be understood that when the connecting structure 50 is a long strip, the connecting structure 50 is wrapped by the flexible member 60, and the massaging device 1 of the present disclosure can be an electric penis product which is suitable for being inserted into the female vagina. When the massaging device 1 works, the driving motor 30 drives the flexible member 60 to reciprocate and rotate by the connecting structure 50 and the transmission mechanism 40. Therefore, the massaging device 1 can simulate the movements of male penis moving into and out of the female vagina, and providing a bring better sexual experience. In this process, since the flexible member 60 of this embodiment has the external massaging protrusion 62, the external massaging protrusion 62 can enhance the pleasure feeling of female users, and the flexible member 60 can effectively stimulate the skin of the female vagina. In particular, the massaging protrusion 62 has a spiral shape, when the connecting structure 50 brings the flexible member 60 to reciprocate and rotate, the massaging protrusion 62 can spiral to fully and comprehensively contact the skin of the female vagina, so that the sexual pleasure will be more intense, and it easier for female user to have an orgasm experience. The flexible member 60 is not covered by the housing 10 as described. The flexible member 60 has a connecting part 64, the connecting structure 50 also has a connecting part 55 corresponded with the connecting part 64, the top end of the housing 10 has a connecting protrusion 102, the connecting part 55 and the connecting part 64 are rotatably and movably connected with the connecting protrusion 102. The massaging device 1 of this embodiment can also have a negative pressure generator 72 the negative pressure generator 72 can generate positive and negative pressures alternatively, the positive and negative pressures can be transmitted to the portions to be massaged through the nozzle 71, to improve the massaging effect. The massaging device 1 further includes a mounting bracket 12, a battery 21, a charging seat 23, a control circuit board 22, a driving rod 42, a sleeve 43, and a resisting member. The mounting bracket 12 include a support plate 13 and a case 14. The driving rod 42 includes a driving end 420, a receiving hole 421, and a spiral groove 422.

In particular, as shown in FIGS. 1-5, when the connecting structure 50 has a receiving cavity 531 for receiving the flexible member 60, the massaging device 1 can be formed into an airplane cup, a sperm extractor, or other products for male. The male user can insert the penis into the groove 611, the penis is wrapped by the flexible member 60, and when the massaging device 1 works, the flexible member 60 rotates around the penis and reciprocates along the penis, to fully stimulate the skin of the penis, so that male user can have a higher sense of sexual pleasure. Similarly, since the flexible member 60 in this embodiment has the massaging protrusion 62, the massaging protrusion 62 can more strongly stimulate the skin of the penis, which can further enhance the pleasure of the male user. In particular, when the flexible member 60 rotates and reciprocates under a driven of the connecting structure 50 and the driving motor 30, the spiral shaped massaging protrusion 62 can spirally move to more fully and comprehensively squeeze the skin of the penis, so that the sense of sexual pleasure will be more intense, which can make it easier for male users to have an orgasm experience.

In the above embodiments, the fixed connection mode between the connecting structure 50 and the driving rod 42 includes adhesive mode, threaded connection mode, threaded connection mode, etc., the present disclosure does not limit this.

The above description is merely some embodiments. It should be noted that for one with ordinary skills in the art, improvements can be made without departing from the concept of the present disclosure, but these improvements shall fall into the protection scope of the present disclosure.

What is claimed is:

1. A massaging device, comprising:

an electric control module;

a driving motor, electrically connected with the electrical control module;

a transmission mechanism, connected with the driving motor;

a connecting structure, connected with the transmission mechanism; and a flexible member, connected with the connecting structure, wherein the driving motor is configured to drive the flexible member to rotate and reciprocate simultaneously by the connecting structure and the transmission mechanism.

2. The massaging device of claim 1, further comprising a housing defining an inner space, the flexible member and the connecting structure are at least partially received in the inner space, and the flexible member is configured to rotate and reciprocate without interfering with the housing.

3. The massaging device of claim 2, wherein a gap is defined between an outer surface of the flexible member and an inner surface of the housing.

4. The massaging device of claim 2, wherein an inner surface of the flexible member is provided with at least one massaging protrusion.

5. The massaging device of claim 1, wherein the flexible member comprises a body and at least one massaging protrusion arranged on the body, at least a portion of the massaging protrusion is arranged in a spiral shape.

6. The massaging device of claim 1, wherein the connecting structure comprises:

a receiving member, configured to receive the flexible member; and a first connecting member, configured to connect the transmission mechanism with the receiving member.

7. The massaging device of claim 1, wherein the connecting structure further comprises a second connecting member; and the massaging device further comprises an outer housing and a top cover, the second connecting member is configured to detachably connect the top cover with the outer housing.

8. The massaging device of claim 1, wherein the massaging device further comprises a housing, the flexible member is sleeved outside the connecting structure, and the connecting structure and the flexible member are rotatably and movably connected with the housing.

9. The massaging device of claim 8, wherein an outer surface of the flexible member is provided with at least one massaging protrusion.

10. The massaging device of claim 1, wherein the transmission mechanism comprises:

a driving shaft, connected with an output shaft of the driving motor;

a driving rod, defining a spiral groove and a receiving hole for receiving the driving shaft, the driving rod is movably connected with the driving shaft;

a sleeve, sleeved around the driving rod; and a resisting member, fixed on the sleeve and partially received in the spiral groove.

11. The massaging device of claim 10, wherein the massaging device further comprises an outer housing and a mounting bracket mounted in the outer housing, the sleeve is mounted on the mounting bracket, the driving rod is partially passed through the mounting bracket to connect with the connecting structure.

12. The massaging device of claim 10, wherein cross sections of the receiving hole and the driving shaft have a polygon shape.

13. The massaging device of claim 1, wherein the transmission mechanism comprises:

a gear set, comprising an input gear connected with an output shaft of the driving motor, an output gear connected with the input gear, and a transmission gear connected with the input gear;

a driving shaft, connected with the transmission gear;

a driving rod, defining a spiral groove and a receiving hole for receiving the driving shaft, the driving rod is movably connected with the driving shaft;

a sleeve, rotatably sleeved around the driving rod and connected with the output gear; and a resisting member, fixed on the sleeve and/or output gear and partially received in the spiral groove.

14. The massaging device of claim 13, wherein the massaging device further comprises an outer housing and a mounting bracket mounted in the outer housing, the sleeve and the driving motor are mounted on the mounting bracket, the driving rod is partially passed through the mounting bracket to connect with the connecting structure.

15. The massaging device of claim 1, wherein the massaging device further comprises:

a flexible cover;

at least one vibrating protrusion, arranged on the flexible cover; and a vibrator, configured to enable the at least one vibrating protrusion to vibrate.

16. The massaging device of claim 1, wherein the massaging device further comprises a housing, the housing comprises an outer housing and a mounting bracket for mounting the transmission mechanism, the mounting bracket is sealed with an inner surface of the outer housing.

17. A massaging device, comprising:

a housing, defining an inner space;

an electric control module, received in the inner space;

a driving motor, electrically connected with the electrical control module and received in the inner space;

a transmission mechanism, connected with the driving motor and received in the inner space;

a connecting structure, connected with the transmission mechanism and received in the inner space; and a flexible member, connected with the connecting structure and received in the inner space, wherein the driving motor is configured to drive the flexible member to rotate and reciprocate simultaneously by the connecting structure and the transmission mechanism.

18. The massaging device of claim 17, wherein a gap is defined between the flexible member and the housing.

19. A massaging device, comprising:

a housing, comprising a connecting protrusion;

an electric control module, received in the housing;

a driving motor, electrically connected with the electrical control module and received in the housing;

a transmission mechanism, connected with the driving motor and received in the housing;

a connecting structure, connected with the transmission mechanism, the connecting structure is rotatably and movably connected with the connecting structure; and a flexible member, sleeved around the connecting structure, wherein the driving motor is configured to drive the flexible member to rotate and reciprocate simultaneously by the connecting structure and the transmission mechanism.

* * * * *